US011577587B2

United States Patent
Yamagata (10) Patent No.: US 11,577,587 B2
(45) Date of Patent: Feb. 14, 2023

(54) VEHICLE DOOR SUPPORT DEVICE

(71) Applicant: U-Shin Ltd., Tokyo (JP)

(72) Inventor: Mikio Yamagata, Hiroshima (JP)

(73) Assignee: U-SHIN LTD., Tokyo (JP)

( * ) Notice: Subject to any disclaimer, the term of this patent is extended or adjusted under 35 U.S.C. 154(b) by 369 days.

(21) Appl. No.: 16/828,133

(22) Filed: Mar. 24, 2020

(65) Prior Publication Data

US 2020/0376940 A1   Dec. 3, 2020

(30) Foreign Application Priority Data

May 27, 2019   (JP) .............................. JP2019-098432

(51) Int. Cl.
  *B60J 5/10*   (2006.01)
  *E05D 13/00*   (2006.01)

(52) U.S. Cl.
  CPC .......... *B60J 5/107* (2013.01); *E05D 13/1238* (2013.01); *E05Y 2900/532* (2013.01)

(58) Field of Classification Search
  CPC ..... B60J 5/107; E05D 13/1238; E05F 15/622; E05F 5/06; E05C 17/30; E05Y 2201/21; E05Y 2201/258; E05Y 2201/46; E05Y 2201/474; E05Y 2900/546
  USPC .......................................................... 296/56
  See application file for complete search history.

(56) References Cited

U.S. PATENT DOCUMENTS

| 10,900,270 B2 * | 1/2021 | Takizawa ................. B60J 5/101 |
| 11,021,903 B2 * | 6/2021 | Goto ..................... E05F 15/622 |
| 11,142,938 B2 * | 10/2021 | Kummer ............... E05F 15/622 |
| 11,339,599 B2 * | 5/2022 | Wirth .................. F16H 25/2454 |
| 2009/0307749 A1 | 12/2009 | Lee et al. |

(Continued)

FOREIGN PATENT DOCUMENTS

| CN | 106320883 | 1/2017 | |
| CN | 111997467 A * | 11/2020 | ............. B60J 5/107 |

(Continued)

OTHER PUBLICATIONS

Office Action dated Nov. 22, 2022 in corresponding Chinese Patent Application No. 202010194677.9, with English language translation.

(Continued)

*Primary Examiner* — Jerry E Redman
(74) *Attorney, Agent, or Firm* — Wenderoth, Lind & Ponack, L.L.P.

(57) ABSTRACT

A vehicle door support device includes a support member and a support member that hold a door at an open position. Each of these support members includes: a cylindrical accommodating portion; a cylindrical cover connected to the accommodating portion; a cylindrical movable member movable relative to the cover in an axial direction; a gear mechanism arranged in the accommodating portion; a spindle connected to a first connecting portion of the gear mechanism; a rotation mechanism that rotates the spindle by movement of the movable member relative to the cover; and a coil spring that biases the movable member so as to advance with respect to the cover. At least the support member includes a magnetoresistive mechanism that is arranged in the accommodating portion, is connected to the second connecting portion of the gear mechanism, and applies a load to the spindle via the gear mechanism.

6 Claims, 9 Drawing Sheets

(56) References Cited

U.S. PATENT DOCUMENTS

| | | | | |
|---|---|---|---|---|
| 2014/0173988 A1* | 6/2014 | Bochen | ................ | E05F 15/611 |
| | | | | 49/340 |
| 2017/0362876 A1* | 12/2017 | Ishikawa | ................ | H02K 7/14 |
| 2018/0216390 A1* | 8/2018 | Takizawa | ................ | F16H 1/32 |
| 2019/0284861 A1* | 9/2019 | Goto | ..................... | E05F 15/622 |
| 2020/0217118 A1* | 7/2020 | Wirth | ................. | F16H 25/2454 |
| 2020/0355009 A1* | 11/2020 | Kummer | ................ | F16H 25/20 |
| 2020/0376940 A1* | 12/2020 | Yamagata | ............ | E05D 13/1238 |

FOREIGN PATENT DOCUMENTS

| | | | | |
|---|---|---|---|---|
| JP | 2015-90212 | | 5/2015 | |
| JP | 2017-115404 | | 6/2017 | |
| JP | 2017-172180 | | 9/2017 | |
| WO | 2008/007912 | | 1/2008 | |
| WO | WO-2010017800 A1 * | 2/2010 | ............. | H02K 11/21 |
| WO | WO-2021023742 A1 * | 2/2021 | ............ | E05F 15/622 |
| WO | WO-2022112107 A2 * | 6/2022 | | |

OTHER PUBLICATIONS

Notice of Reasons for Refusal dated Dec. 13, 2022 in Japanese Application No. 2019-098432, with English langauge translation.

* cited by examiner

VEHICLE DOOR SUPPORT DEVICE

BACKGROUND OF THE INVENTION

Technical Field

The present invention relates to a vehicle door support device.

Description of the Related Art

JP 2015-90212 discloses a support member that is arranged between a vehicle body and a back door of a vehicle, biases the door so as to be open with respect to vehicle body, and holds the door at an open position. The support member has an outer cylinder and an inner cylinder accommodated in the outer cylinder so as to be capable of advancing and retracting, and the inner cylinder is biased by a coil spring and a gas spring so as to advance with respect to the outer cylinder. The gas spring also has a function of preventing the door from being open and closed suddenly when the door is open and closed with respect to the vehicle body.

For the gas spring, it is difficult to finely adjust a load determined by charging a gas (nitrogen gas) and oil. Since the gas is affected by changes in temperature and environment, it is difficult to maintain a constant load. Therefore, there is room for improvement in the support member of JP 2015-90212.

An object of the present invention is to provide a vehicle door support device that can stably apply a predetermined load and easily adjust the magnitude of the load.

SUMMARY OF THE INVENTION

One aspect of the present invention provides a vehicle door support device including a first support member and a second support member that have a first connection end respectively connected to a vehicle body and a second connection end connected to a door, and are capable of holding the door at an open position with respect to the vehicle body. Each of the first support member and the second support member includes: a cylindrical accommodating portion that has an end portion forming one of the first connection end and the second connection end; a cylindrical cover that is connected to an opposite side of the end portion of the accommodating portion; a cylindrical movable member that has an end portion forming tie other of the first connection end and the second connection end, is accommodated in the cover on an opposite side of the end portion, and is movable relative to the cover in an axial direction; a gear mechanism that is arranged in the accommodating portion, has a first connecting portion located close to the cover and a second connecting portion located close to the end portion of the accommodating portion, and sets a rotational speed of the first connecting portion to be lower than a rotational speed of the second connecting portion; a spindle that is arranged in the movable member and connected to the first connecting portion; a rotation mechanism that rotates the spindle by movement of the movable member relative to the cover; and a coil spring that is arranged in the movable member and biases the movable member so as to advance with respect to the cover. At least the first support member further includes a magnetoresistive mechanism that is arranged in the accommodating portion, is connected to the second connecting portion, and applies a load to the spindle via the gear mechanism.

According to the vehicle door support device, the movable member is biased by the extension of the coil spring when the door is unlocked from the vehicle body, so that the movable member advances with respect to the cover while the spindle rotates via the rotation mechanism. Then, the door is held at the open position with respect to the vehicle body by a biasing force of the coil spring. However, when the door is rotated so as to be closed with respect to the vehicle body, the coil spring contracts as the movable member is pressed toward the cover, so that the movable member retracts with respect to the cover while the spindle rotates via the rotation mechanism. Then, the door is held in a closed state as the door is locked with the vehicle body.

When the door is open and closed, a load can be applied to spindle via the gear mechanism by the magnetoresistive mechanism provided in the first support member. Therefore, the door can be prevented from being suddenly open and closed with respect to the vehicle body. Since the magnetoresistive mechanism is connected to the second connection of the gear mechanism, a larger load can be applied to the spindle depending on a gear ratio of the gear mechanism as compared with a case where the magnetoresistive mechanism is connected to the first connecting portion of the gear mechanism. A magnetic resistance is hardly affected by changes in temperature or environment, and the magnitude of the magnetic resistance generated by the magnetoresistive mechanism can be adjusted by changing a magnetizing force, and thus, a predetermined load can be stably applied to the spindle.

In the vehicle door support device of the present invention, the determined load can be stably applied to the door, and the magnitude of the load is also easily adjusted.

DETAILED DESCRIPTION OF THE PREFERRED EMBODIMENTS

Hereinafter, embodiments of the present invention will be described with reference to the drawings.

First Embodiment

Figure 1:
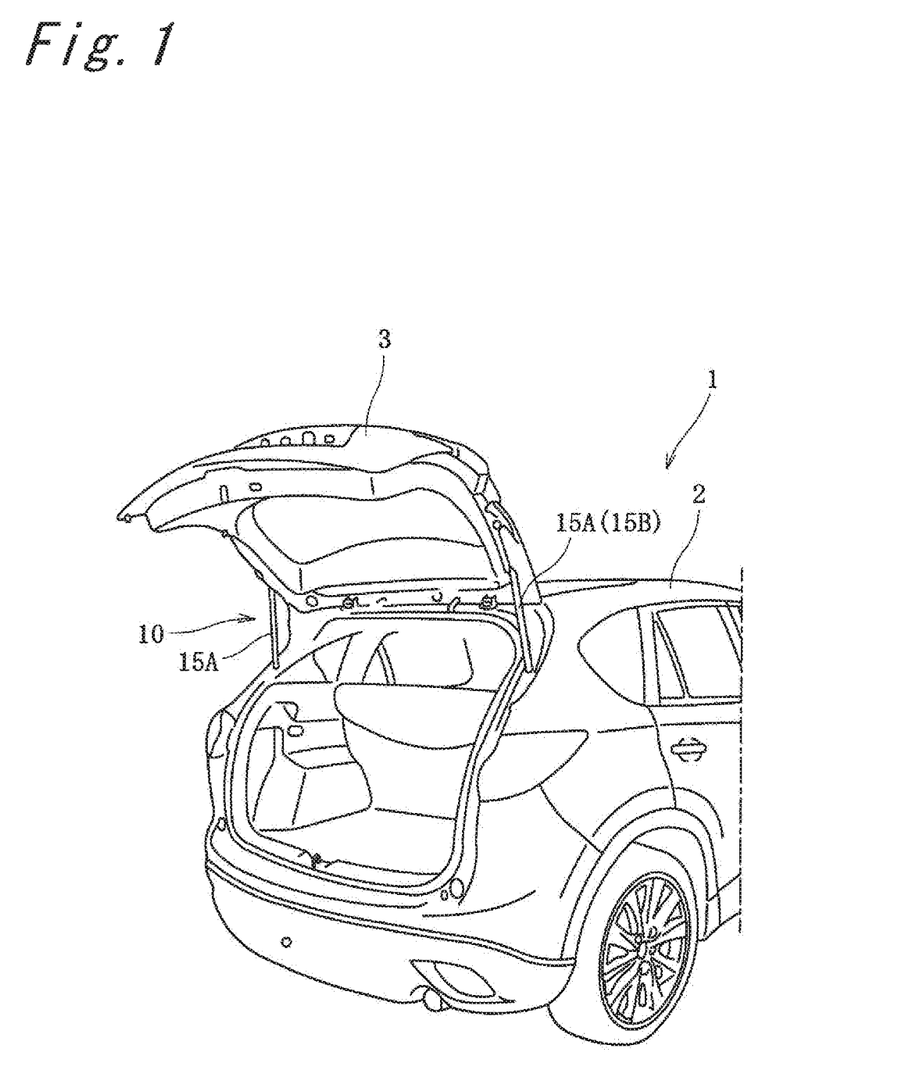
FIG. 1 is a perspective view illustrating a vehicle using a vehicle door support device of the present invention.

FIG. 1 illustrates a state where a vehicle door support device (hereinafter, referred to as "door support device") 10 according to a first embodiment of the present invention is used for a vehicle 1. Referring to FIG. 1, the door support device 10 includes a pair of support members 15A formed in a cylindrical shape, and these support members 13A are arranged between a vehicle body 2 and a back door (hereinafter, referred to as "door") 3. The support member (first support member) 15A located on the left side in FIG. 1, and the support member (second support member) 15A located on the right side in FIG. 1 have the same configuration, and correspond to a driven type that is extended and contracted as the door 3 is open and closed.

Figure 2:
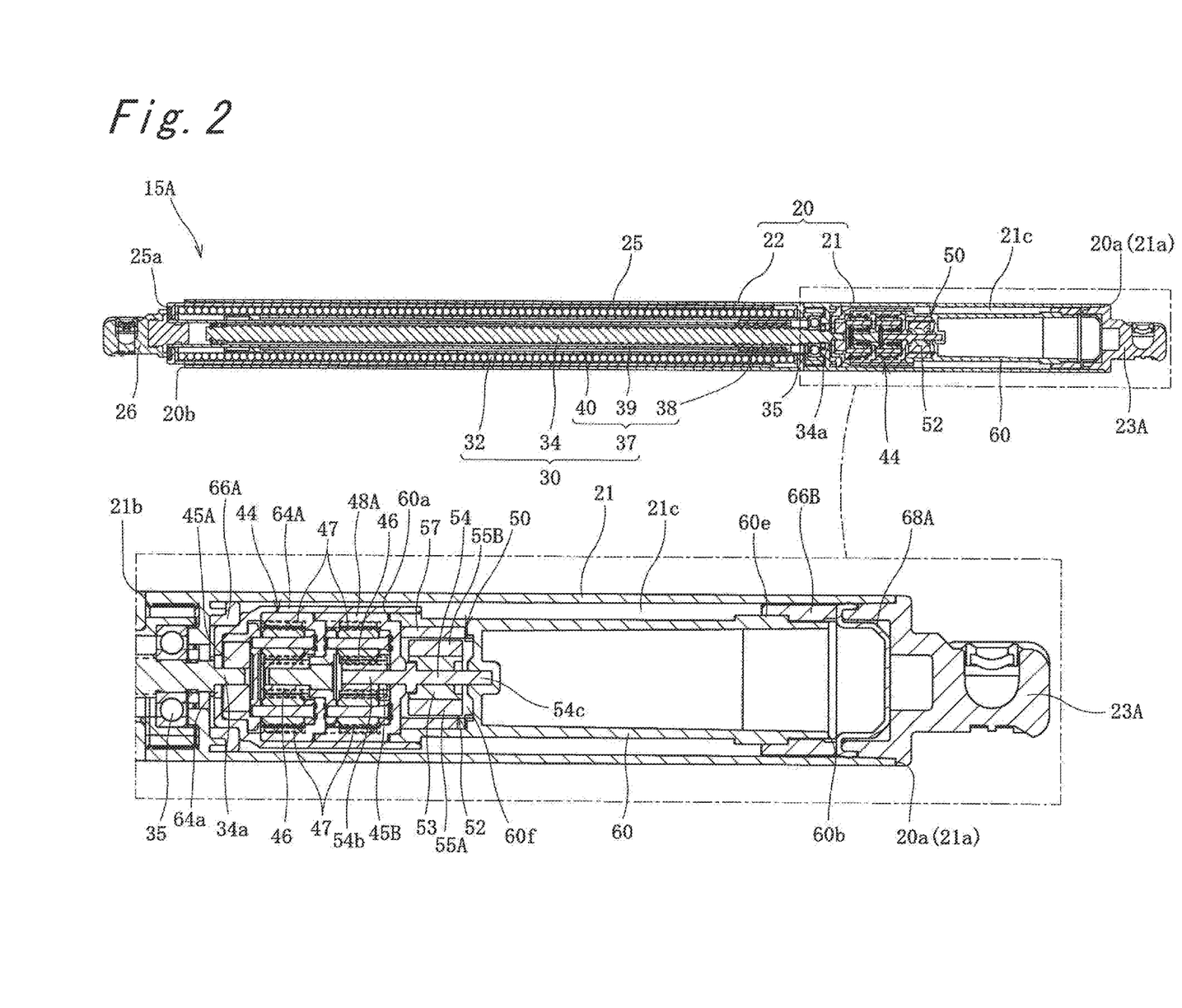
FIG. 2 is a longitudinal sectional view of a support member according to a first embodiment.

Referring also to FIG. 2, the support member 15A includes: a first housing 20 having a connection end (first connection end) 20a connected to the vehicle body 2; and a second housing 25 having a connection end (second connection end) 25a connected to the door 3. The first housing 20 may be connected to the door 3, and the second housing 25 may be connected to the vehicle body 2. When the second housing 25 advances with respect to the first housing 20, the door 3 is held at an open position with respect to the vehicle body 2. When the second housing 25 retracts with respect to the first housing 20, the door 3 can be closed with respect to the vehicle body 2.

(Basic Configuration of Support Member)

As illustrated in FIG. 2, the support member 15A includes the first housing 20, the second housing 25, a telescopic mechanism 30, and a gear mechanism 44.

The first housing 20 includes a cylindrical accommodating portion 21 and a cylindrical cover 22 connected to the accommodating portion 21. The gear mechanism 44 and a magnetoresistive mechanism 50 are accommodated in the accommodating portion 21. In FIG. 2, an end portion 21a of the accommodating portion 21 located on the right side is the connection end 20a, The connection end 20a is open and closed by a shaft end member 23A. The cover 22 is screwed and connected with an end portion 21b of the accommodating portion 21 on the opposite side of the end portion 21a. A diameter of the cover 22 is the same as a diameter of the accommodating portion 21. The accommodating portion 21 and the cover 22 may have an integral structure.

The second housing 25 is a movable member that is arranged coaxially within the cover 22 and is relatively movable in the axial direction with respect to the cover 22. An outer diameter of the second housing 25 is smaller than, an inner diameter of the first housing 20. An end portion of the second housing 25 located on the left side in FIG. 2 is the connection end 25a. The connection end 25a is open and closed by a shaft end member 26. The shaft end member 26 including the connection end 25a protrudes from a distal end 20b of the first housing 20 (cover 22) even in a state where the second housing 25 retracts with respect to the first housing 20.

The telescopic mechanism 30 includes; a coil spring 32 that advances the second housing 25 with respect to the first housing 20; a spindle 34 and a rotation mechanism 37 that guide the movement (extension and contraction) of the second housing 25 with respect to the first housing 20.

The coil spring 32 elastically biases the second housing 25 so as to advance with respect to the first housing 20 (cover 22). The coil spring 32 is accommodated in the second housing 25 and is arranged coaxially with the second housing 25 in a compressed state. One end of the coil, spring 32 located on the right side in FIG. 2 abuts on the first housing 20, and the other end of the coil spring 32 located on the left side in FIG. 2 abuts on the second housing 25.

The spindle 34 is accommodated in the second housing 25 so as to extend along the axis of the second housing 25. A proximal end 34a of the spindle 34 protrudes from the second housing 25 and is mechanically, connected to the gear mechanism 44 in the first housing 20. The proximal end 34a side of the spindle 34 is rotatably supported by a bearing 35 arranged in the cover 22.

The rotation mechanism 37 rotates the spindle 34 about the axis of the second housing 25 by moving the second housing 25 relative to the cover 22, The rotation mechanism 37 includes a spindle nut 38, a push rod 39, and a guide tube 40. The spindle nut 38, the push rod 39, and the guide tube 40 are arranged between the coil spring 32 and the spindle 34 in the radial direction of the second housing 25. More specifically, the guide tube 40 is arranged inside the coil spring 32, the push rod 39 is accommodated inside the guide tube 40, and the spindle nut 38 is fixed to one end of the push rod 39.

The gear mechanism 44 is arranged near the end portion 21b in the accommodating portion 21. The gear mechanism 44 is a transmission mechanism that changes the rotational speed input from one end side and outputs the changed rotational speed from the other end in the axial direction of the first housing 20. The gear mechanism 44 has a first connecting portion 45A arranged close to the cover 22 and a second connecting portion 45B arranged close to the connection end 20a. Each of the first connecting portion 45A and the second connecting portion 45B includes one sun gear 46 located on the axis of the first housing 20 and a plurality of (for example, four) planetary gears 47 arranged on the outer periphery of the sun gear 46. In addition, the connecting portions 45A and 45B include a case 48A surrounding the outside of the plurality of planetary gears 47. Teeth with which the planetary gear 47 meshes zine formed on an inner peripheral surface of the case 48A.

A gear ratio of the gear mechanism 44 is set such that the rotational speed on the first connecting portion 45A side is lower than the rotational speed on the second connecting portion 45B side. In other words, the rotation input to the first connecting portion 45A is accelerated and output to the second connecting portion 45B, and the rotation input to the second connecting portion 45B is decelerated and output to the first connecting portion 45A. The proximal end 34a of the spindle 34 is mechanically connected to the sun gear 46 of the first connecting portion 45A. The magnetoresistive mechanism 50 is mechanically connected to the sun gear 46 of the second connecting portion 45B.

As illustrated in FIG. 2, the second housing 25 retracts with respect to the first housing 20 in a state where the door 3 is closed with respect to the vehicle body 2. In this state, the coil spring 32 is compressed and the spindle nut 38 is located near the proximal end 34a of the spindle 34.

When the door 3 is unlocked from the vehicle body 2 by operating a door etch device (not illustrated), the second housing 25 is pressed (biased) so as to advance due to the elastic extension of the coil spring 32. As a result, the second housing 25 advances with respect to the cover 22 while the spindle 34 rotates via the rotation mechanism 37. When the door 3 rotates to the open position with respect to the vehicle body 2, the door 3 is held by a biasing force of the coil spring 32.

When the door 3 is operated (rotated) so as to be closed with respect to the vehicle body 2, the second housing 25 is pressed toward the cover 22, and the coil spring 32 contracts against the biasing force. As a result, the second housing 25 retracts with respect to the cover 22 while the spindle 34 rotates via the rotation mechanism 37. When the door 3 is locked with the vehicle body 2, the door 3 is held in a closed state.

The spindle nut 38 and the push rod 39 are engaged with the guide tube 40 and the first housing 20 so as not to rotate relatively. Therefore, the rotational movement of the spindle 34 is converted into the linear movement of the spindle nut 38 relative to the guide tube 40 when the door 3 is open and closed. As a result, the spindle nut 38 and the push rod 39 move in the axial direction. In addition, the movement of the push rod 39 causes the second housing 25 to move relative to the first housing 20.

Figure 8:
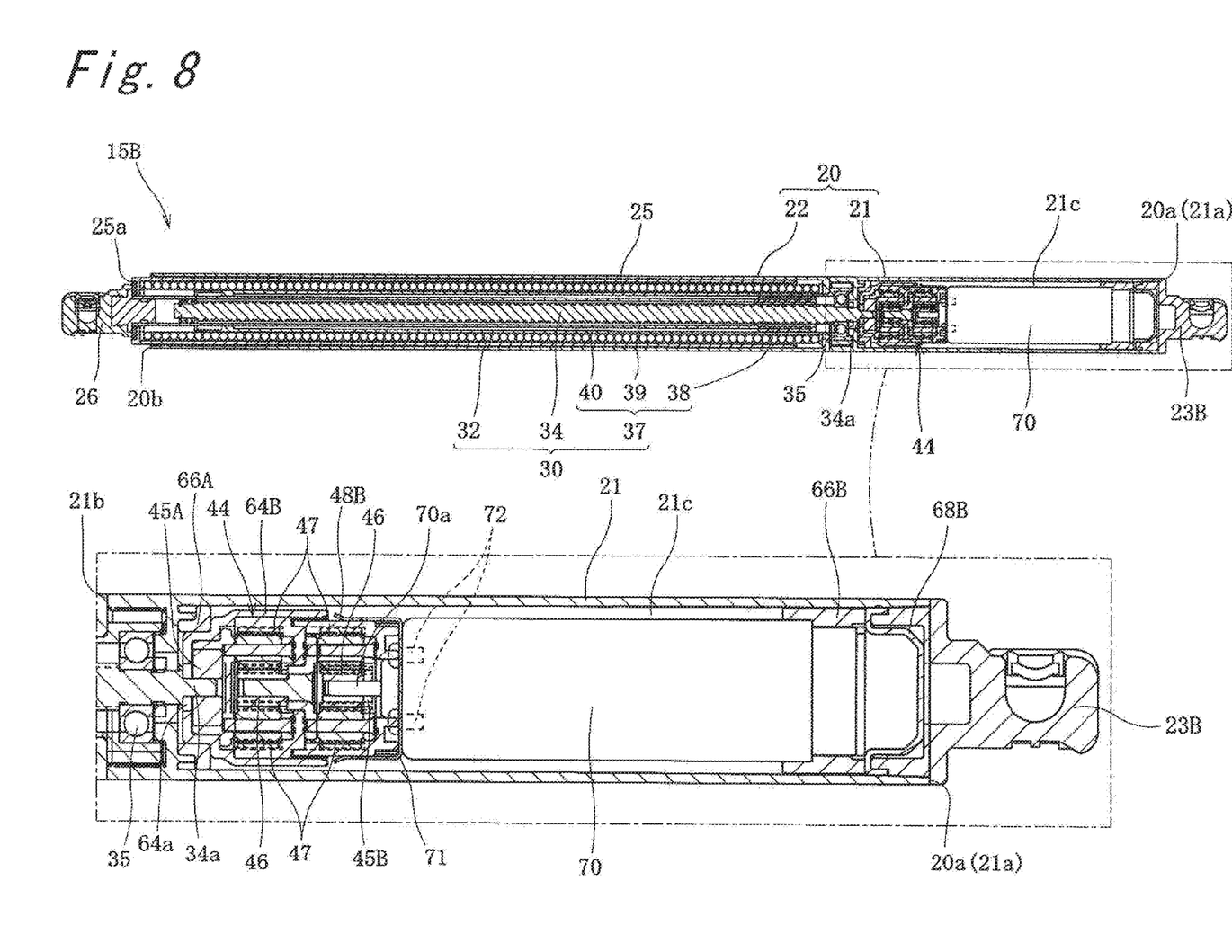
FIG. 8 is a longitudinal sectional view of a second support member according to a second embodiment.

In order to prevent the door 3 from suddenly being open and closed with respect to the vehicle body 2, the magnetoresistive mechanism 50 configured to apply a load to the spindle 34 is arranged in the accommodating portion 21 of the support member 15A in addition to the gear mechanism 44. Referring to FIG. 8, an electric motor 70 configured to rotate the spindle 34 is arranged in the accommodating portion 21 of a support member 15B, which will be described later, in addition to the gear mechanism 44. A dimension of the magnetoresistive mechanism 50 is different from a dimension of the electric motor 70 in the axial direction of the accommodating portion 21. In order to arrange the magnetoresistive mechanism 50 and the electric motor 70 in the accommodating portion 21 having the same structure, the accommodating portion 21 is provided with an arrangement portion 21c including a space in which the electric motor 70 can be arranged.

As illustrated in FIG. 2, the arrangement portion 21c is a columnar space between the gear mechanism 44 and the shaft end member 23A in the accommodating portion 21. As described above, a dimension of the arrangement portion 21c is larger than the dimension of the magnetoresistive mechanism 50 in the axial direction of the accommodating portion 21. Therefore, a spacer 60 is further arranged between the gear mechanism 44 and the shaft end member 23A on the support member 15A of the present embodiment.

(Overview of Interior of Accommodating Portion)

Figure 3:
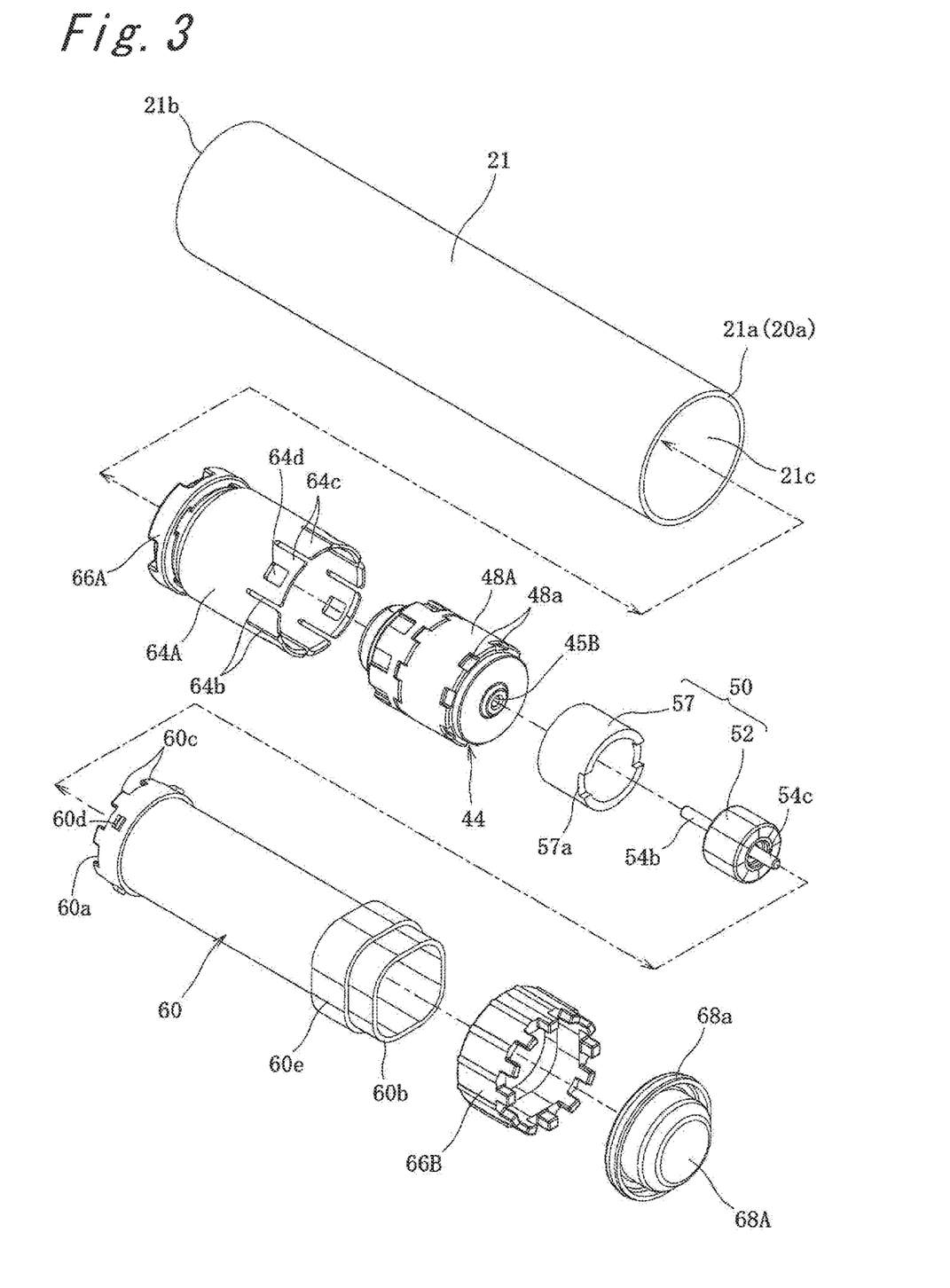
FIG. 3 is an exploded perspective view of an accommodating portion in FIG. 2.

As illustrated in FIGS. 2 and 3, the magnetoresistive mechanism 50, the spacer 60, a gear box 64A, dampers 66A and 66B, and a grommet 68A are arranged on the arrangement portion 21c of the support member 15A.

Figure 4:
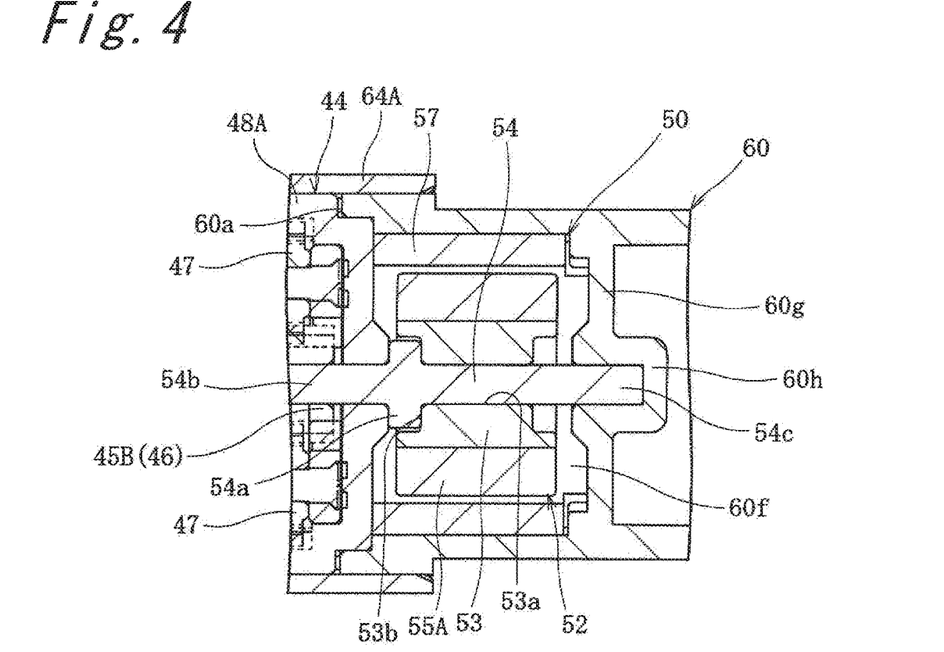
FIG. 4 is a sectional view of a mounting portion of a magnetoresistive mechanism.
Figure 5:
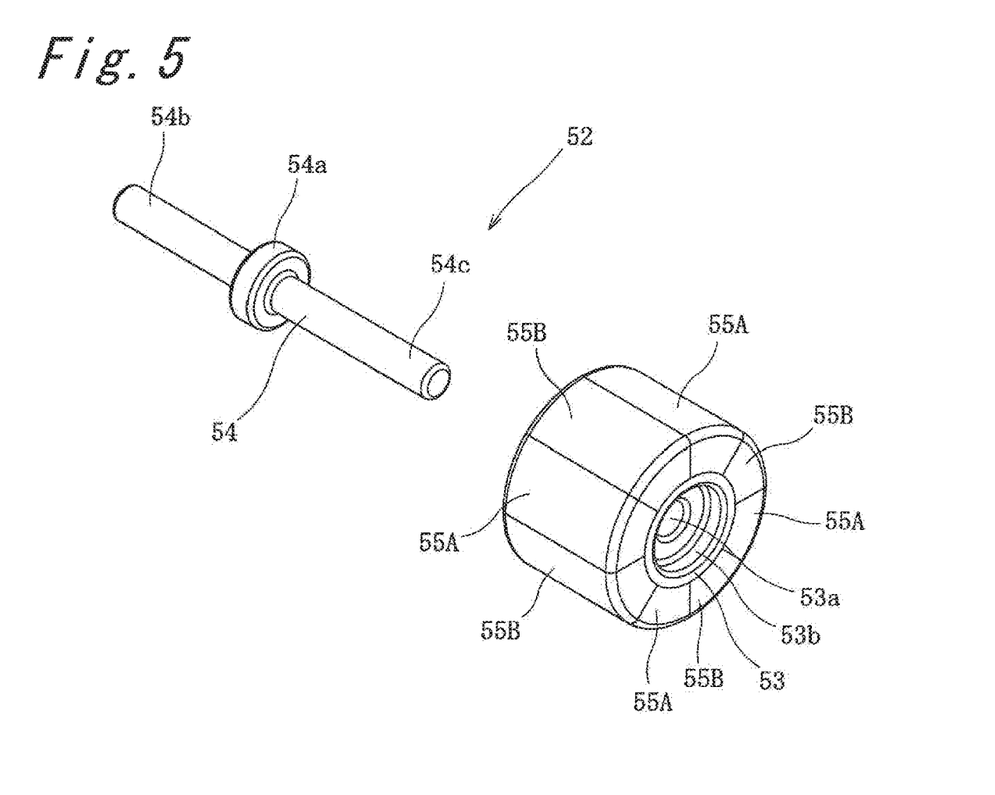
FIG. 5 is an exploded perspective view of, a rotating member constituting the magnetoresistive mechanism.
Figure 6:
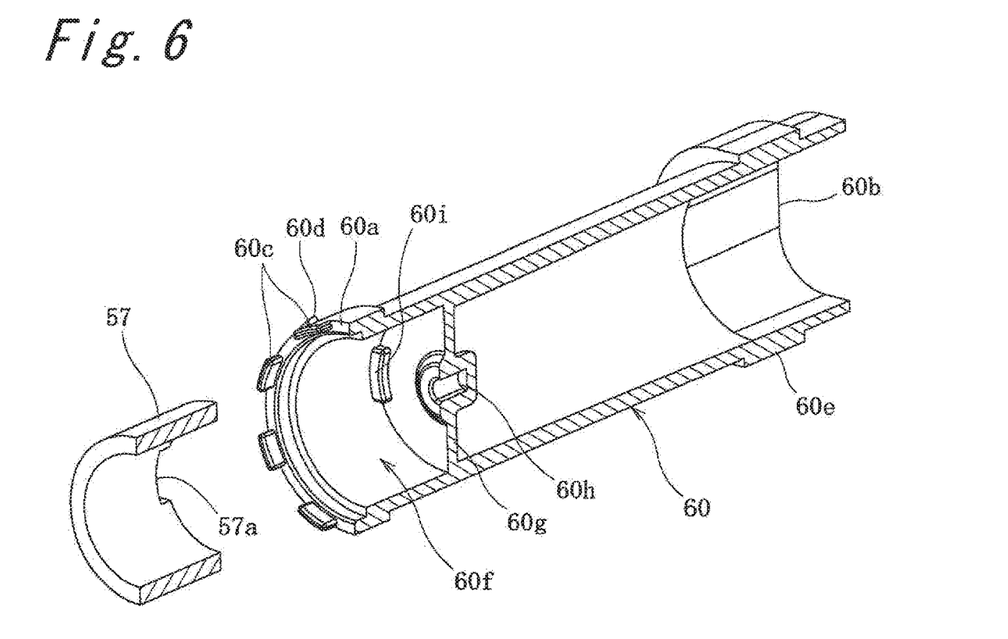
FIG. 6 is a sectional perspective is of a fixed member and a spacer constituting the magnetoresistive mechanism.

Referring to FIGS. 4 to 6, the magnetoresistive mechanism 50 is a non-contact type, resistance unit that includes: a rotating member 52 rotatably arranged in the spacer 60 (accommodating portion 21); and a fixed member 57 non-rotatably fixed in the spacer 60.

As illustrated most clearly in FIG. 5, the rotating member 52 includes: a cylindrical core material 53; a shaft member 54 arranged along the axis of the core material 53; and a plurality of (eight in the present embodiment) magnets (permanent magnets) 55A and 55B fixed to the outer periphery of the core material 53.

The core material 53 is made of resin and has a through-hole 53a penetrating along the axis thereof. Concave portions 53b that are recessed in a circular shape are provided at both ends in the axial direction of the core material 53.

The shaft member 54 is made of nonmagnetic metal (for example, stainless steel), and is a rod-shaped member baying a diameter that can be pressed against the inner surface of the through-hole 53a. An intermediate portion of the shaft member 54 is provided with a flange 54a that protrudes radially outward and is arranged in the concave portion 53b. A total length of the shaft member 54 is longer than an axial dimension of the core material 53, and a part of the shaft member 54 penetrating through the through-hole 53a protrudes from both ends of the core material 53. One of the pair of protruding portions forms a first shaft portion 54b mechanically connected to the second connecting portion 45B. The other of the pair of protruding portions forms a second shaft portion 54c rotatably supported by the spacer 60.

The magnet 55A is a portion that generates an S-pole magnetic force, and the magnet 55B is a portion that generates an N-pole magnetic force. The magnet 55A and the magnet 55B are formed in a fan shape, are alternately arranged in the circumferential direction on the outer surface of the core material 53, and have a cylindrical shape as a whole. In the axial direction of the shaft member 54, dimensions of the magnets 55A and 55B are the same as the dimension of the core material 53.

The fixed member 57 is a cylindrical member that can surround the magnets 55A and 55B (rotating member 52) about the axis of the shaft member 54. That is, an inner diameter of the fixed member 57 is larger than an outer diameter of the rotating member 52, and a gap having a predetermined interval (for example, 0.5 mm) is formed between the fixed member 57 and the rotating member 52. An axial dimension of the fixed member 57 is larger than the dimensions of the magnets 55A and 55B. More specifically, the axial dimension of the fixed member 57 is set such that one end of the fixed member 57 abuts on a partition wall 60g of the spacer 60 and the other end of the fixed member 57 abuts on an end face of the gear mechanism 44. As a result, the fixed member 57 is sandwiched between the partition wall 60g and the gear mechanism 44. As illustrated most clearly in FIG. 6, a notch 57a is provided at one end of the fixed member 57, and a convex portion 60i of the spacer 60 is locked into the notch 57a in order to restrict the rotation of the fixed member 57 about the shaft member 54.

Figure 7:
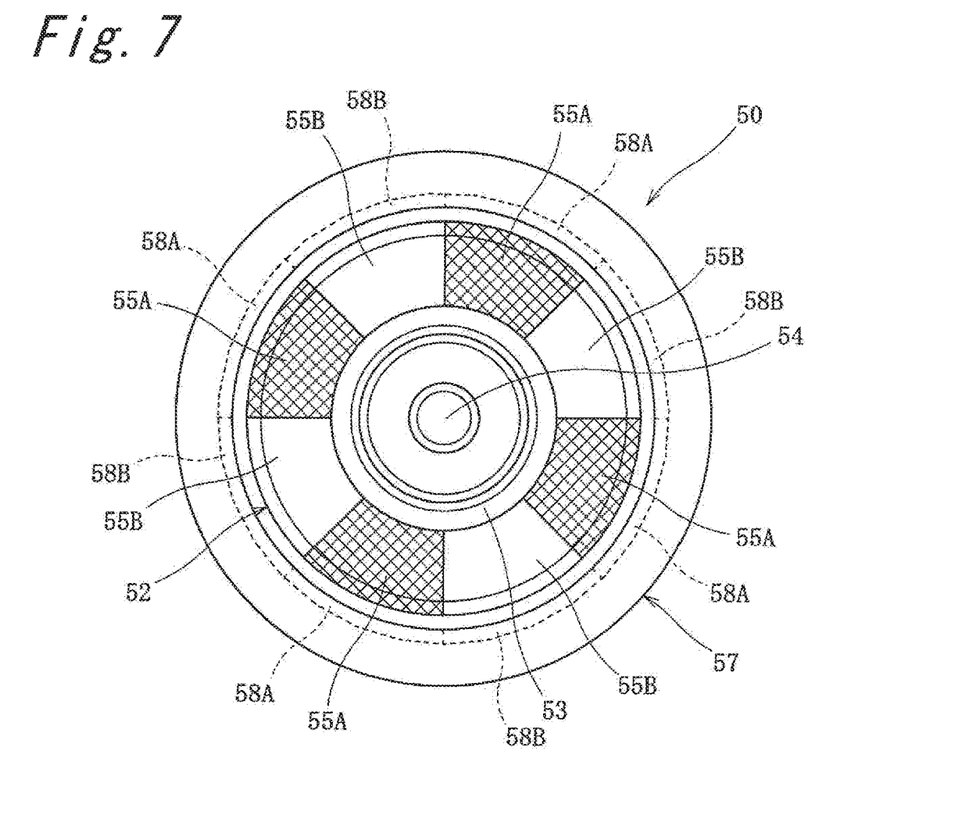
FIG. 7 is a front view illustrating resistance action by the magnetoresistive mechanism.

The fixed member 57 is formed using a magnetic material (for example, an alnico magnet (Al—Ni—Co magnet)) that is easily magnetized by the magnetic forces of the magnets 55A and 55B and is easily demagnetized. As illustrated in FIG. 7, in the fixed member 57, a portion 58A opposing the magnet 55A (S pole) is magnetized to the N pole, and a portion 58B opposing the magnet 55B (N pole) is magnetized to the S pole. That is, the portion 58A magnetized to the N pole and the portion 58B magnetized to the S pole are alternately formed in the fixed member 57 in the circumferential direction.

In the direction in which the rotating member 52 rotates, the portion 58B magnetized to the S pole is formed on the front side of the magnet 55A (S pole), and the portion 58A magnetized to the N pole is formed on the front side of the magnet 55B (N pole). The magnets 55A and 55B and the magnetized portions 58B and 58A having the same polarity repel each other, and thus, form a resistance of the rotation of the rotating member 52. Therefore, a load can be applied to the spindle 34 via the gear mechanism 44.

The magnetic resistance by the magnetoresistive mechanism 50 is smaller than the biasing force of the coil spring 32 to rotate the spindle 34 via the rotation mechanism 37 at the time of opening the door 3 and a pressing force of the door 3 to rotate the spindle 34 via the rotation mechanism 37 at the time of closing the door 3. Therefore, when the door 3 is open and closed, the spindle 34 rotates against the resistance of the magnetoresistive mechanism 50, and the rotating member 52 is driven to rotate via the gear mechanism 44. The magnetic resistance of the magnetoresistive mechanism 50 is adjusted (set) by changing magnetizing forces of the magnets 55A and 55B and the axial dimensions (total length) of the magnets 55A and 55B.

When the magnet 55B (N pole) is located inside the portion 58A magnetized to the N pole due to changes of rotation angle positions of the magnets 55A and 55B along with the rotation of the rotating member 52, the magnetized portion 58A is demagnetized and becomes the portion 58B newly magnetized to the S pole. When the magnet 55A (S pole) is located inside the portion 58B magnetized to the S pole, the magnetized portion 58B is demagnetized and becomes the portion 58A newly magnetized to the N pole. That is, the magnetization and demagnetization are repeated on the inner surface side of the fixed member 57 according to the magnets 55A and 55B located inside. Therefore, it is possible to continue applying a predetermined load stably to the spindle 34.

As illustrated in FIGS. 2 and 6, the spacer 60 is a cylindrical member including: a first end 60a that supports the gear mechanism 44; and a second end 60b that supports the shaft end member 23A via the damper 66B and the grommet 68A. An inner diameter of the spacer 60 is substantially the same as an outer diameter of the fixed member 57, and a outer diameter of the spacer 60 is smaller than the inner diameter of the accommodating portion 21. At the first end 60a of the spacer 60, a plurality of positioning convex portions 60c, which are fitted to positioning concave portions 48a formed on the outer peripheral surface of the cast 48A, are provided so as to protrude at intervals in the circumferential direction. A locking claw 60d configured to be locked with the gear box 64A protrudes from the outer surface of the spacer 60 located on the first end 60a side. An annular step 60e restricting the movement of the damper 66B toward the first end 60a protrudes from the outer surface of the spacer 60 located on the second end 60b side.

A mounting portion 60f configured to mount the magnetoresistive mechanism 50 is provided on the first end 60a side of the spacer 60. The partition wall 60g is provided inside the spacer 60, and a portion between the partition wall 60g and the first end 60a forms the mounting portion 60f. A bearing portion 60h, which rotatably supports the second shaft portion 54c of the shaft member 54, is provided at the center of the partition wall 60g. The bearing portion 60h has a concave portion that is recessed toward the second end 60b, and restricts the movement of the shaft member 54 in the axial direction and the radial direction. In addition, the mounting portion 60f is provided with the convex portion 60i that protrudes from the outer peripheral portion of the partition wall 60g toward the first end 60a and, is locked with the notch 57a of the fixed member 57. As illustrated in FIGS. 2 and 3, the gear box 64A is a cylindrical container that is open at one end and accommodates the gear mechanism 44. An axial dimension of the gear box 64A is large enough to cover the outer periphery from the first connecting portion 45A of the gear mechanism 44 to the first end 60a of the spacer 60. A through-hole 64a through which the spindle 34 penetrates is provided at a closed end of the gear box 64A located on the cover 22 side. At the open end of the gear box 64A located on the spacer 60 side, a plurality of slits 64b extending in the axial direction are provided at intervals in the circumferential direction. A plurality of elastically deformable tongue pieces 64c are formed by these slits 64b. A predetermined tongue piece 64c among them has a locking hole 64d with which the locking claw 60d is locked.

The dampers 66A and 66B are made of rubber, and buffer an impact and a vibration with respect to components arranged in the accommodating portion 21. Among them, the damper 66A is arranged at an end on the cover 22 side of the gear box 64A, and the damper 66B is arranged at an end on the connection end 20a side of the spacer 60. The maximum outer diameter of the dampers 66A and 66B is formed to be the same as the inner diameter of the accommodating portion 21 so as to hold the integrated gear mechanism 44, magnetoresistive mechanism 50, and spacer 60 in a non-contact state with respect to the accommodating portion 21.

The grommet 68A is arranged between the spacer 60 (damper 66B) and the shaft end member 23A in the accommodating portion 21 to prevent water from entering the portion between the accommodating portion 21 and the shaft end member 23A. The grommet 68A includes an annular sealing piece 68a to be pressed against the inner surface of the accommodating portion 21.

In the support member configured in this manner, the rotating member 52 of the magnetoresistive mechanism 50 rotates via the gear mechanism 44 when the spindle 34 rotates by opening and closing the door 3. As a result, it is possible to apply the load to the spindle 34 via the gear mechanism 44 and reduce the rotational speed of the spindle 34 due to the magnetic resistance generated between the rotating member 52 (magnets 55A and 55B) and the fixed member (magnetic body) 57 as described above. Since the second housing 25 can be prevented from suddenly advancing and retracting with respect to the first housing 20, the door 3 can be prevented from being suddenly open and closed with respect to the vehicle body 2.

Since the first shaft portion 54b of the magnetoresistive mechanism 50 is connected to the second connecting portion 45B of the gear mechanism 44, a larger load can be applied to the spindle 34 as compared with a case where the first shaft portion 54b is connected to the first connecting, portion 45A. Specifically, the gear mechanism 44 is configured such that the rotational speed of the first connecting portion 45A is lower than the rotational speed of the second connecting portion 45B. Therefore, the rotational speed of the rotating member 52 becomes higher than the rotational speed of the spindle 34 depending on the gear ratio of the gear mechanism 44. For example, when the gear ratio of the gear mechanism 44 is sixteen times, the rotating member 52 rotates sixteen times while the spindle 34 rotates once. On the other hand, when the spindle 34 is connected to the magnetoresistive mechanism 50 and the magnetoresistive mechanism 50 is connected to the first connecting portion 45A, the rotational speed of the spindle 34 and the rotational speed of the rotating member 52 are the same. The magnetic resistance generated while the rotating member 52 rotates once is the same. Therefore, when the magnetoresistive mechanism 50 is connected to the second connecting portion 45B, it is possible to apply a larger load to the spindle 34 depending on the gear ratio of the gear mechanism 44 as compared with the case when the magnetoresistive mechanism 50 is connected to the first connecting portion 45A. Therefore, the sudden opening and closing of the door 3 with respect to the vehicle body 2 can be effectively prevented.

As compared with a gas spring, the non-contact type magnetoresistive mechanism 50 is less susceptible to changes in temperature and environment. Moreover, the magnitude of the magnetic resistance of the magnetoresistive mechanism 50 can be easily adjusted by changing the magnetizing forces of the magnets 55A and 55B and the axial dimensions (total length) of the magnets 55A and 55B. Therefore, it is possible to apply a predetermined load stably to the spindle 34.

The accommodating portion 21 includes the arrangement portion 21e having the space wider than the axial dimension of the magnetoresistive mechanism 50, and the spacer 60 is arranged in the arrangement portion 21c, and thus, the gear mechanism 44 can be accommodated in the accommodating portion 21 without rattling. Since the spacer 60 is provided with the mounting portion 60f of the magnetoresistive mechanism 50, the magnetoresistive mechanism 50 can be reliably mounted even, on the arrangement portion 21c having the space larger than the magnetoresistive mechanism 50.

Second Embodiment

Figure 9:
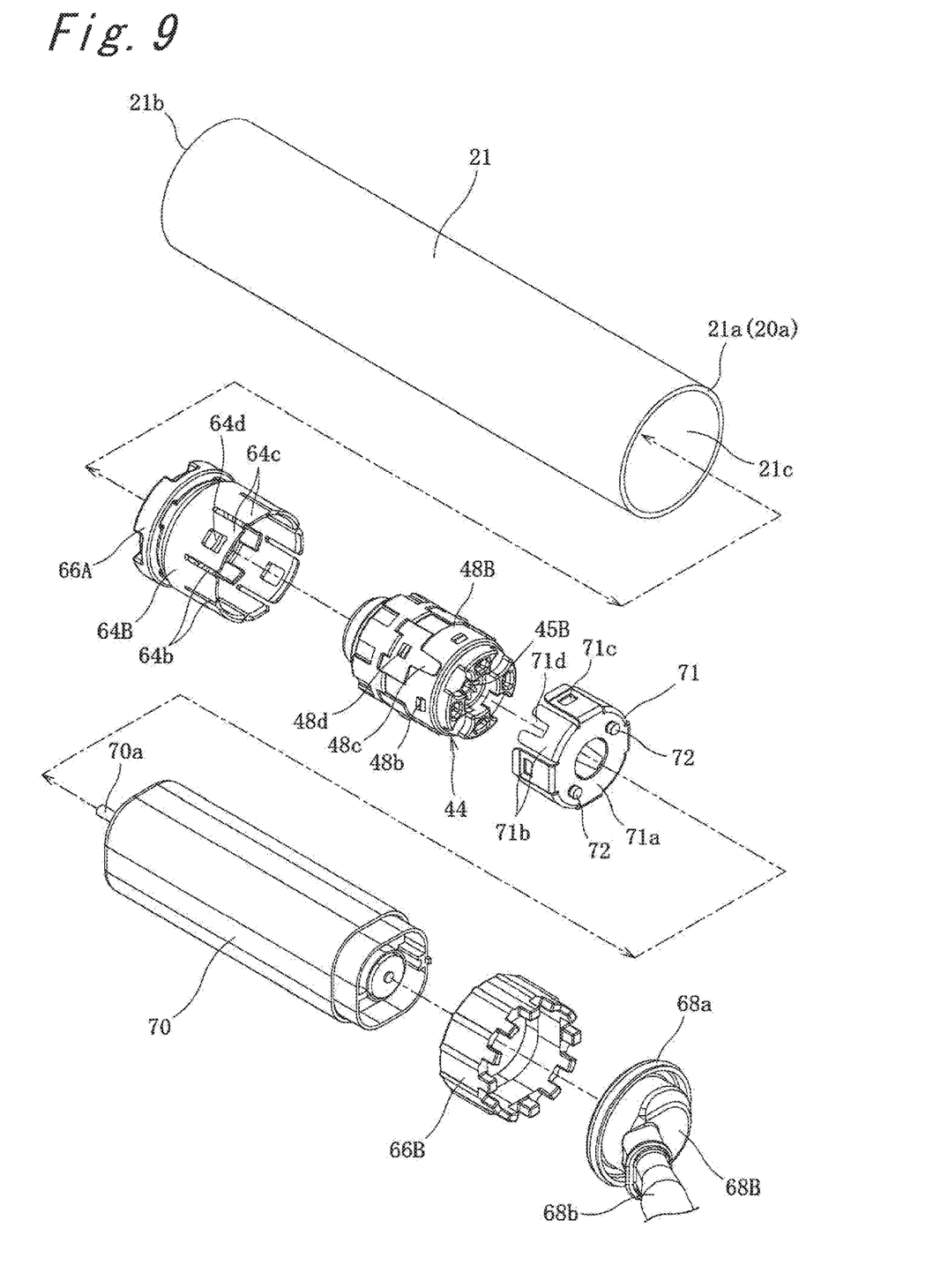
FIG. 9 is an exploded perspective view of an accommodating portion in FIG. 8.

FIGS. 8 and 9 illustrate the support member 15B used for the door support device 10 according to a second embodiment. In the door support device 10 according to the second embodiment, the same support member (first support member) 15 as that in the first embodiment is used on the left side in FIG. 1, and the support member (second support member) 15B illustrated in FIG. 8 is used on the right side in FIG. 1. Referring to FIG. 8, the support member 15B includes the electric motor 70, and is an electric type that can be extended and contracted by driving the electric motor 70 as well as being driven by opening and closing the door 3. The door support device 10 according to the second embodiment using the driven support member 15A and the electric support member 15B constitutes a door opening and closing device capable of automatically opening and closing the door 3.

As illustrated in FIG. 8, the support member 15B includes the first housing 20, the second housing 25, the telescopic mechanism 30, and the gear mechanism 44. Referring also to FIG. 2, the first housing 20, the second housing 25, the telescopic mechanism 30, and the gear mechanism 44 are common components which are also used for the driven support member 15A. That is, the driven support member 15A and the electric support member 15B have the same basic configuration. However, a case 48B different from the case 48A is used for the gear mechanism 44.

As illustrated in FIGS. 8 and 9, the same arrangement portion 21c as that of the support member 15A is formed in the accommodating portion 21 of the support member 15B. In addition to the electric motor 70, a clamp 71, a gear box 64B, the dampers 66A and 66B, and a grommet 68B are arranged in the arrangement portion 21c. Among them, the dampers 66A and 66B are components common to the driven support member 15A.

The electric motor 70 is a drive unit capable of forward rotation and reverse rotation, and is electrically connected to an electronic control unit (ECU) of the vehicle 1. The electric motor 70 includes an output shaft 70a protruding from one end of a motor case in the axial direction. The output shaft 70a is mechanically connected to the second connecting portion 45B of the gear mechanism 44.

The clamp 71 is made of metal and is provided to connect the electric motor 70 with the gear mechanism 44. The clamp 71 includes an annular substrate 71a, and the substrate 71a is fixed to an end face of the electric motor 70 on the output shaft 70a side by a screw 72. A plurality of (eight) elastic pieces 71b, which protrude in the axial direction and can be elastically deformed in the radial direction, are provided on the outer periphery of the substrate 71a at intervals in the circumferential direction. On the elastic pieces 71b, a locking hole 71c with which a locking claw 48b provided on the case 48B of the gear mechanism 44 is locked and a positioning grooves 71d which fit into a positioning convex portion 48c of the case 48B are alternately provided. The electric motor 70 and the gear mechanism 44 can be integrated by arranging the electric motor 70 to which the clamp 71 is fixed with the screw on the second connecting portion 45B side of the gear mechanism 44 to fit the clamp 71 into the outside of the case 48B.

An axial dimension of the gear box 64B is shorter than an axial dimension of the gear box 64A. Specifically, the axial dimension of the gear box 64B is large enough to cover the outer periphery from the first connecting portion 45A of the gear mechanism 44 to an intermediate portion of the case 48B. The gear box 64B includes the through-hole 64a, the slit 64b, the tongue piece 64c, and the locking hole 64d similarly to the gear box 64A, but is different from the gear box 64A in terms that a locking claw 48d provided on the case 48B is locked with the locking hole 64d.

The damper 66A is arranged on the gear box 64B, and the damper 66B is arranged at an end of the electric motor 70 on the connection end 20a side. The dampers 66A and 66B hold the integrated gear mechanism 44 and electric motor 70 in a non-contact state with respect to the accommodating portion 21.

The grommet 68B is different from the grommet 68A in terms of including a cylindrical lead-out portion 68b that leads out a lead wire connected to the electric motor 70 in a watertight manner. Note that a shaft end member 2313 used for the support member 15B is different from the shaft end member 23A used for the support member 15A in terms of including a hole (not illustrated) corresponding to the lead-out portion 68b.

The electric motor 70 of the support member 15B configured in this manner is driven by a command from the ECU. When the electric motor 70 is driven for opening, the speed is reduced by the gear mechanism 44, the spindle 34 rotates forward, and the second housing 25 advances with respect to the first housing 20 via the rotation mechanism 37. When the electric motor 70 is driven for closing, the speed is reduced by the gear mechanism 44, the spindle 34 reversely rotates, and the second housing 25 retracts with respect to the first housing 20 via the rotation mechanism 37. As a result, the door 3 is open and closed with respect to the vehicle body 2.

When the door 3 is unlocked by the operation of the door latch device or when the door 3 at the open position is manually closed, the opening and closing of the door 3 causes the spindle 34 to rotate, and the electric motor 70 is driven to rotate via the gear mechanism 44, which is similarly to the support member 15A. As a result, the electric motor 70 form a rotational resistance, applies a load to the spindle 34 via the gear mechanism 44, and can reduce the rotational speed of the spindle 34. Since the second housing 25 can be prevented from suddenly advancing and retracting with respect to the first housing 20, the door 3 can be prevented from being suddenly open and closed with respect to the vehicle body 2.

The driven support member 15A and the electric support member 15B include the common first housing 20, second housing 25, gear mechanism 44, spindle 34, rotation mechanism 37, and coil spring 32. The magnetoresistive mechanism 50 and the electric motor 70 can be selectively arranged in the arrangement portion 21c of the first housing 20. That is, either the driven type capable of only supporting the door 3 or the electric type capable of automatically opening and closing the door 3 can be set depending on which of the magnetoresistive mechanism 50 and the electric motor 62 is used.

Since the basic components of the driven support member 15A and the electric support member 15B are common, the manufacturing cost can be reduced as compared with a case where different components are used. Moreover, when one of the two support members is the driven support member 15A and the other is the electric support member 15B, the basic components of the both are common, and thus, it is easy to adjust the balance at the time of controlling the opening and closing of the door 3.

More specifically, the support members 15A and 15B include the common second housing 25 having the same built-in coil spring 32, and the door 3 can be held with substantially the same load by both the support members 15A and 15B, and thus, the deformation of the door 3 can be prevented. Moreover, the door 3 can be held with substantially the same load by both the support members 15A and 15B by setting the resistance generated by the driven support member 15A of the magnetoresistive mechanism 50 to be equal to the resistance generated by a cogging torque of the motor 70 of the electric support member 15B, and thus, the deformation of the door 3 can be effectively prevented.

The vehicle door support device 10 of the present invention is not limited to the configuration of the above embodiments, and various modifications can be made.

Figure 10:
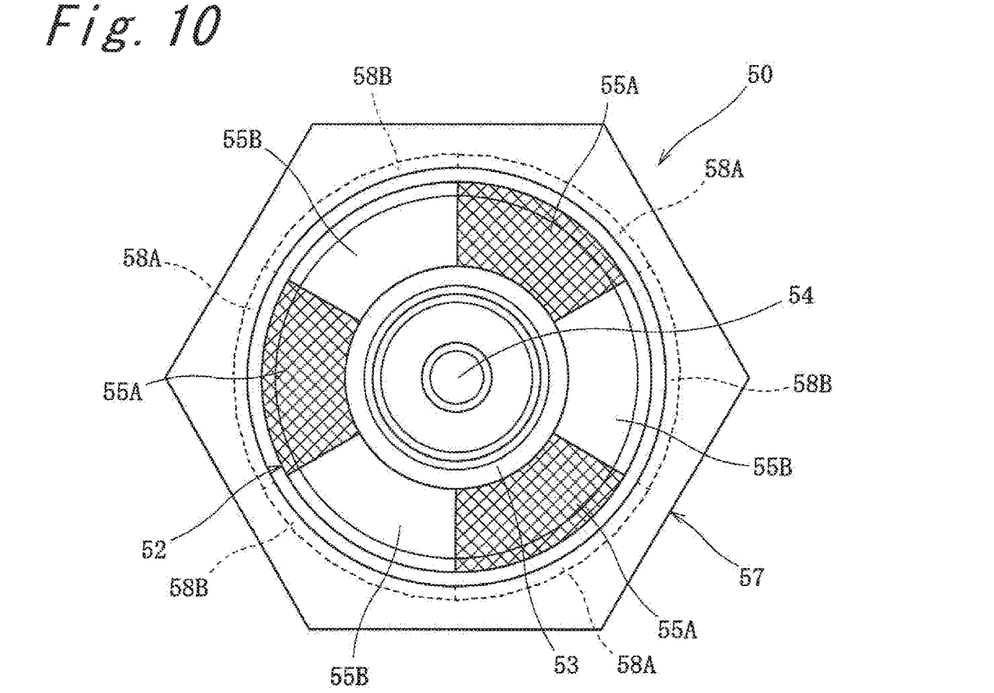
FIG. 10 is a front view illustrating a modification of the magnetoresistive mechanism.

For example, as illustrated in FIG. 10, the number of magnets 55A and magnets 55B constituting the magnetoresistive mechanism 50 may be six, and the number can be changed as needed. However, it is preferable that the number of the magnets 55A and 55B be an even number of two or more. In addition, the magnet 55A and the magnet 55B may be arranged at intervals in the circumferential direction of the core material 53.

As illustrated in FIG. 10, the fixed member 57 of the magnetoresistive mechanism 50 may have a polygonal (hexagonal shape in the drawing) outer surface, and the outer surface shape can be changed as needed. In addition, an outer surface shape of the core material 53 and inner surface shapes of the magnets 55A and 55B can be changed as necessary.

The fixed member 57 is entirely formed using the magnetic material (magnetic body), but may be formed using a non-magnetic material (non-magnetic body) at least at the outer peripheral portion. In addition, an electromagnet may be used for the magnetoresistive mechanism 50.

Figure 11:
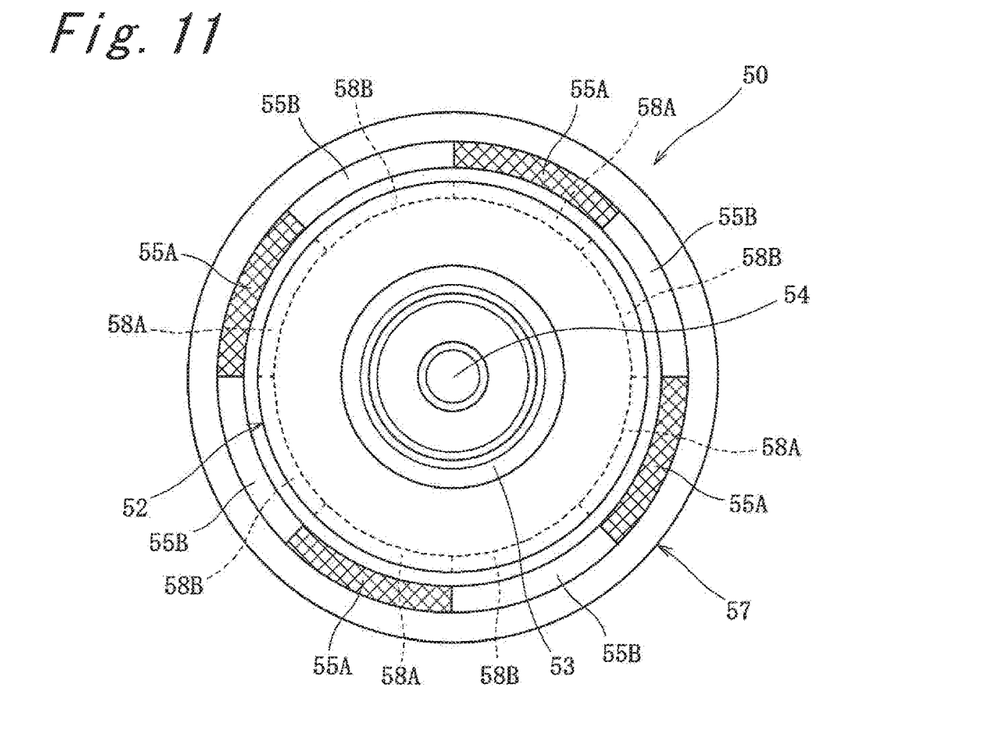
FIG. 11 is a front view illustrating another modification of the magnetoresistive mechanism.

As illustrated in FIG. 11, the fixed member 57 may include the magnets 55A and 55B, and the rotating member 52 may include the magnetic body, in the magnetoresistive mechanism 50.

Figure 12:
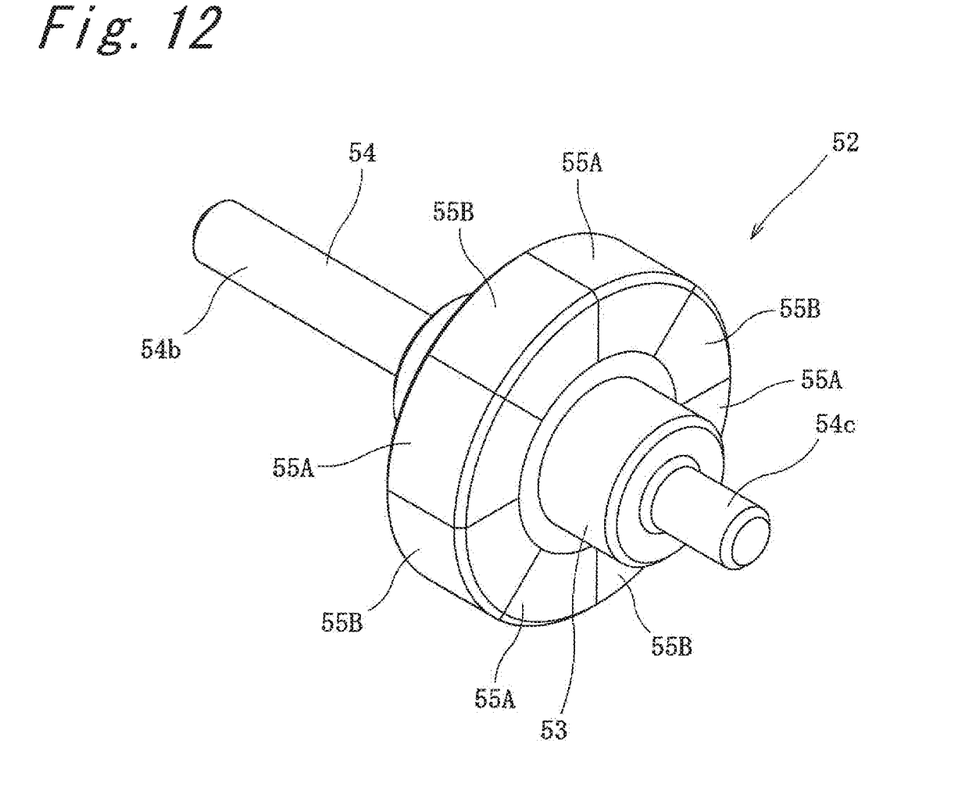
FIG. 12 is a perspective view illustrating a modification of a rotating member constituting the magnetoresistive mechanism.

As illustrated in FIG. 12, the rotating member 52 may be configured such that the core material 53, the shaft member 54, and the magnets 55A and 55B are integrally provided by insert-molding.

What is claimed is:

1. A vehicle door support device comprising:
a first support member; and
a second support member, each of the first support member and the second support member having a first connection end connected to a vehicle body and a second connection end connected to a door, the first support member and the second support member being configured to hold the door in an open position with respect to the vehicle body,
wherein each of the first support member and the second support member includes:
a cylindrical accommodating portion having an end portion forming one of the first connection end and the second connection end;
a cylindrical cover connected to an opposite side of the end portion of the accommodating portion;
a cylindrical movable member having an end portion forming the other of the first connection end and the second connection end, the cylindrical movable member being accommodated in the cover on the opposite side of the end portion, and being movable relative to the cover in an axial direction;
a gear mechanism arranged in the accommodating portion, the gear mechanism having a first connecting portion located close to the cover and a second connecting portion located close to the end portion of the accommodating portion, and the gear mechanism being configured to set a rotational speed of the first connecting portion to be lower than a rotational speed of the second connecting portion;
a spindle arranged in the movable member and connected to the first connecting portion;
a rotation mechanism configured to rotate the spindle by movement of the movable member relative to the cover; and
a coil spring arranged in the movable member and configured to bias the movable member so as to advance the movable member with respect to the cover, and
wherein at least the first support member further includes a magnetoresistive mechanism arranged in the accommodating portion, the magnetoresistive mechanism being connected to the second connecting portion and being configured to apply a load to the spindle via the gear mechanism.

2. The vehicle door support device according to claim 1, wherein:
each of the first support member and the second support member includes a shaft end member arranged in the end portion of the accommodating portion,
an arrangement portion is defined between the gear mechanism and the shaft end member in the accommodating portion, the arrangement portion having a space wider than a dimension of the magnetoresistive mechanism in an axial direction of the accommodating portion, and
the magnetoresistive mechanism is arranged in the arrangement portion of the first support member.

3. The vehicle door support device according to claim 2, further comprising a spacer arranged on the arrangement portion of the first support member, the spacer including a first end supporting the gear mechanism, a second end supporting the shaft end member, and a mounting portion to allow mounting of the magnetoresistive mechanism.

4. The vehicle door support device according to claim 3, wherein the magnetoresistive mechanism includes:
a rotating member having a shaft portion connected to the second connecting portion; and
a cylindrical fixed member surrounding the rotating member about an axis of the shaft portion and being non-rotatably fixed in the accommodating portion,
wherein one includes a magnet and the other of the rotating member and the fixed member includes a magnetic body, and
wherein the fixed member is sandwiched between a wall of the mounting portion and the gear mechanism.

5. The vehicle door support device according to claim 2, wherein the second support member includes an electric motor arranged on the arrangement portion, the electric motor being connected to the second connecting portion, and being configured to rotate the spindle via the gear mechanism.

6. The vehicle door support device according to claim 1, wherein the magnetoresistive mechanism includes:
   a rotating member having a shaft portion connected to the second connecting portion; and
   a cylindrical fixed member surrounding the rotating member about an axis of the shaft portion and being non-rotatably fixed in the accommodating portion, and wherein one of the rotating member and the fixed member includes a magnet and the other of the rotating member and the fixed member includes a magnetic body.

* * * * *